March 2, 1965  K. HEINRICH  3,171,758
DEVICE FOR PROCESSING SUGAR CANE
Original Filed Feb. 21, 1962  4 Sheets-Sheet 1

INVENTOR
Kurt Heinrich by:
Michael S. Striker

March 2, 1965

K. HEINRICH

3,171,758

DEVICE FOR PROCESSING SUGAR CANE

Original Filed Feb. 21, 1962

INVENTOR
Kurt Heinrich by:
Michael J. Striker
Atty

March 2, 1965     K. HEINRICH     3,171,758
DEVICE FOR PROCESSING SUGAR CANE
Original Filed Feb. 21, 1962     4 Sheets-Sheet 3

FIG.5

INVENTOR
Kurt Heinrich

FIG.6

United States Patent Office 3,171,758
Patented Mar. 2, 1965

3,171,758
DEVICE FOR PROCESSING SUGAR CANE
Kurt Heinrich, Wevelinghoven, Germany, assignor to Maschinenfabrik Buckau R. Wolf Aktiengesellschaft, Grevenbroich, Germany
Original application Feb. 21, 1962, Ser. No. 174,738. Divided and this application Aug. 1, 1963, Ser. No. 299,321
Claims priority, application Germany, Feb. 25, 1961, M 48,175
9 Claims. (Cl. 127—4)

This application is a division of my copending application Serial No. 174,738, filed February 21, 1962, entitled "Method and Device for Processing Sugar Cane."

The present invention relates to a device for processing cane and, more particularly, to a device for recovering sugar as well as useful by-products from sugar cane.

The conventional method of producing sugar from sugar cane comprises the squeezing of the sugar-containing juice from the sugar cane by means of roll presses whereby pressures of more than 1000 kilograms per square centimeter are applied. The sugar cane passes through several successively arranged presses or crushers and the juice squeezed or pressed from the cane in the roll crushers is then combined and further processed. The crushed residue of the sugar cane, the so-called bagasse is used as combustible material in the boilers of the sugar mill. This classic method has certain inherent disadvantages such as the high initial investment for the heavy roll crusher arrangements and the short useful life span or high maintenance costs of the crushers. In view of these disadvantages it has been attempted to adjust the conventional beet sugar process, namely a counter-current diffusion process, to the processing of sugar cane. It was assumed that it would suffice to comminute the sugar cane into sufficiently small particles and after such disintegration to subject the cane particles to the diffusion process. However, the yield of the diffusion process when applied to sugar cane is far below the yield obtainable in the production of beet sugar.

It is therefore an object of the present invention to overcome the above discussed disadvantages and difficulties encountered in the processing of sugar cane.

It is another object of the present invention to provide an apparatus which will permit recovery of sugar from sugar cane in a high yield, with a relatively low initial investment and with low processing and maintenance costs.

It is yet another object of the present invention to reduce the power requirements of the production of cane sugar.

It is still a further object of the present invention to provide an apparatus for the recovery of sugar from sugar cane in a high yield and in a simple and economical manner.

Other objects and advantages of the present invention will become apparent from a further reading of the description and of the appended claims.

With the above and other objects in view, the present invention contemplates in a method of recovering sugar from sugar cane, the steps of subjecting pieces of sugar cane to comminution so as to separate the same into substantially sugar-free fibrous material and sugar-containing medullary material, separating the fibrous material, and recovering sugar from the residual portion of the comminuted sugar cane.

According to a preferred embodiment, the method of the present invention is carried out by separating pieces of sugar cane into portions consisting substantially of sugar-containing medullary sugar cane constituents and portions consisting of substantially sugar-free fibrous sugar cane constituents having medullary constituents adhering thereto, introducing the portions into an aqueous sugar-containing liquid so as to form a suspension of the sugar cane constituents in the aqueous liquid, subjecting the suspension to turbulent motion in such a manner as to separate the medullary constituents adhering to the fibrous constituents from the latter thus forming a suspension of fibrous constituents on the one hand and medullary constituents on the other hand in the aqueous liquid, rupting cell walls of the suspended medullary constituents so as to cause access of the aqueous liquid to the sugar contained in the medullary constituents, thereby dissolving the sugar thus substantially freeing the medullary constituents of sugar and increasing the sugar concentration of the aqueous liquid, withdrawing the substantially sugar-free fibrous constituents from the suspension, the steps of rupturing cell walls and withdrawing fibrous constituents being carried out in any desired sequence, separately withdrawing the substantially sugar-free medullary constituents in a hydrocyclone so as to obtain a substantially solids-free aqueous liquid of increased sugar concentration and a thickened mixture of solid medullary constituents and sugar-containing aqeous liquid, filtering the thickened mixture so as to recover therefrom a portion of the sugar-containing aqueous liquid, washing the thus formed filter residue of medullary constituents so as to recover residual sugar therefrom, and pressing the washed filter residue so as to reduce the water content thereof.

The present invention is also concerned with a device for the recovery of sugar from sugar cane which comprises, in combination, comminuting means for breaking pieces of sugar cane into a mixture of first particles consisting substantially of medullary material and second particles consisting of fibrous material having medullary material adhering thereto, separating and rupturing means for separating the second particles of the mixture into particles consisting substantially only of fibrous material and particles of medullary material and for rupturing cell walls of the medullary material, the separating and rupturing means comprising an elongated treating vessel having two opposite end portions and being adapted to be filled with a suspension of the mixture and aqueous liquid, substantially conical rotatable screen means located in one of the end portions extending substantially through the entire cross-section of the treating vessel, flaring towards the other of the end portions and adapted for passing therethrough of liquid and medullary material only, and means for continuously introducing the mixture and aqueous liquid into the treating vessel so as to substantially completely fill the same, whereby upon rotating of the rotatable screen means the contents of the treating vessel will be subjected to turbulent motion causing separation of fibers from medullary material, rupturing of cells of medullary material and dissolution of the sugar content of the medullary material, first withdrawal means for withdrawing a mixture of liquid and medullary material having passed through the screen means from the one end portion of the treating vessel, and second withdrawal means including a lifting wheel for withdrawing fibrous material from the other of the end portions.

In connection with the present invention it has been realized that the biological structure of sugar cane differs so widely from that of sugar beets that it does not appear possible to obtain a satisfactory sugar recovery from finely particulated sugar cane by subjecting the same to a counter-current diffusion process such as is successfully employed in the beet sugar industry. Microscopic investigation of sugar cane shows that the individual sugar cane comprises a hard wood-like outer portion of about 1 mm. thickness, inwardly followed by a fiber layer of about 2 mm. thickness and consisting of longitudinal fibers which are arranged very close to each other. Inwardly of this protective tubular outer portion of about 3 mm. thickness which gives the sugar cane the required mechanical strength, there will be found the core of the sugar cane which consists of relatively soft medullary cells which contain sugar juice. The medullary cells form a mass somewhat similar to the core portion of elderwood. Longitudinal fibers of very high tensile strength are located spaced from each other throughout this core portion of the sugar cane.

It has now been found that the hard wood-like outer portion, the fiber layer and the longitudinal fibers in the core portion are substantially sugar-free and interfere with the recovery of the sugar juice by diffusion methods, and that it is advantageous to remove these fibrous portions of the sugar cane prior to the actual recovery of the sugar juice.

Furthermore it has been found that the wood-like and fibrous constituents of the sugar cane which, as stated above, interfere with the recovery of sugar, form an excellent starting material for the production of high quality paper, provided that these fibers and wood-like constituents are substantially freed of the medullary constituents of the cane sugar.

The medullary constituents of the sugar cane, after the same are separated from the fibrous and wood-like constituents, form particles which are too small to permit counter-current diffusion leaching, because the relatively small particles of medullary material will flow back with the diffusion liquid. Investigation of these medullary particles has shown that the individual cells thereof consist of an easily rupturable skin which surrounds the sugar-containing juice. In view thereof, it appears advantageous to rupture the skin of the individual medullary cells only to such an extent that the juice from the interior of the cells can unite with the liquid surrounding the cells. The ruptured cell walls are then separated from the sugar originally contained therein, freed of residual sugar by washing, or freed of residual sugar juice by pressing at relatively low pressures.

Thus, according to the present invention, sugar is recovered from comminuted sugar cane by forming a mixture of an aqueous liquid having suspended therein broken sugar cane pieces, separating medullary particles from fiber particles to which they may adhere and then to separate the fibrous constituents from the medullary constituents and to process these different types of sugar cane constituents separately from each other. In this manner, namely by removing the fibrous constituents already at the beginning of the process, it is possible to carry out the recovery of sugar by further treatment of the medullary particles or of an aqueous suspension of only medullary particles so that the further processing can be adjusted to the characteristics of the medullary particles without having to take into consideration the characteristics of the fibrous constituents, since the same are no longer present.

The cell walls of the medullary particles are then ruptured or destroyed so that the sugar juice from the interior of the ruptured cells will mix with the suspending or transporting liquid and will increase the sugar concentration of the same. Thereafter, the sugar-containing transporting or conveying liquid will be separated from the ruptured cell wall material, preferably by pressing, and the cell wall material will be washed so as to remove any residual sugar therefrom.

Since it has been found that the initial comminution of sugar cane pieces for the purpose of separating the same into medullary constituents and fibrous constituents will still result in portions of the medullary constituents adhering to fibrous constituents, the present invention provides that the portion of the medullary constituents which thus adheres to the fibrous material is to be separated from the latter, preferably by subjecting the suspension of fibrous and medullary constituents and of the transporting liquid to strong turbulence so that the fibrous particles will rub against each other and will rub off any adhering medullary particles. Thereafter, the fibrous particles which now are free of adhering medullary particles are separated from the remainder of the suspension which then will consist of the transporting liquid and of medullary particles. The thus separated fibers are then washed in order to remove sugar-containing liquid therefrom, and are then further utilized as a clean by-product, i.e., as a fibrous material which is substantially free of medullary cells.

The method of the present invention will allow advantageous utilization of the fresh processing water which is added during the process. The fresh water is preferably used for washing the separated fibers, as well as the separated ruptured medullary cell material and the thus formed dilute sugar solution is then used as the processing or transporting liquid as will be described in detail further below.

The sugar enriched aqueous liquid which is separated from the ruptured broken medullary cell material is partially further processed for the recovery of sugar therefrom, and partially recycled to form part of the suspension of comminuted fibrous and medullary cane material.

Preferably, according to the present invention, the carrier or transporting liquid which, as stated above, is a sugar-containing aqueous liquid, and which has suspended therein the ruptured or broken medullary cell material, will be thickened in a hydrocyclone, i.e., separated in a hydrocyclone into a thickened mass of medullary material and liquid and into solid-free liquid. The thickened mass is then filtered and the thus-formed filter cake is first washed to remove residual sugar therefrom and then pressed, whereby a second pressing may be carried out, for instance by repeatedly washing and pressing the material in a filter press or a device such as will be described in detail further below. The various sugar-containing wash waters are recycled into the process, while the filter cake is pressed to mechanical dryness and then may be used for various purposes.

Depending on the amount of residual sugar adhering to the pressed filter cake of broken medullary cell material and depending upon economic and technological conditions, it is sometimes desirable and advantageous to introduce the pressed filter cake into a washer or counter-current washer so as to once more extract residual sugar therefrom and then again to filter and press the now substantially sugar-free broken cellular material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
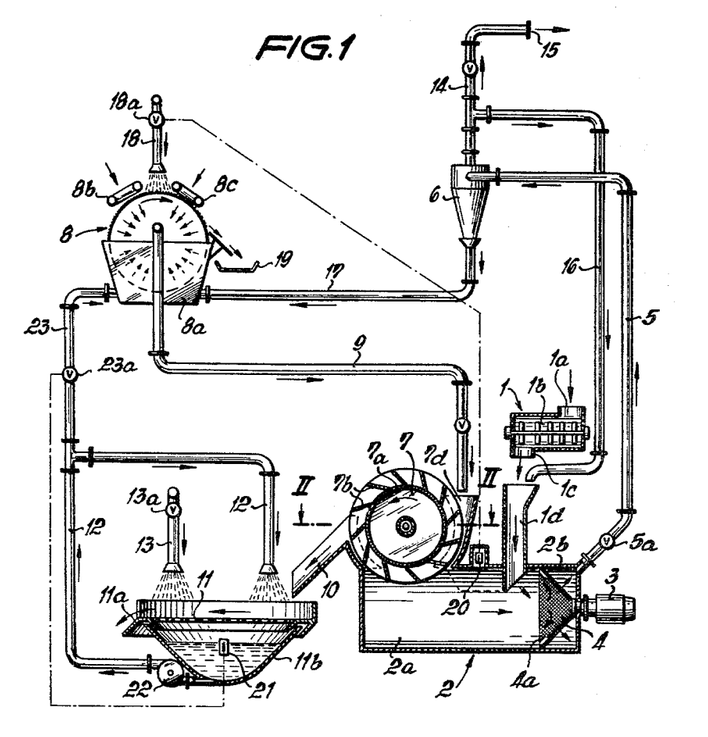
FIG. 1 is a schematic elevational view of a device according to the present invention.

Referring now to the drawings and particularly to FIG. 1, cane breaking mill 1 is shown having an inlet opening 1a and an outlet opening 1c axially spaced from each other and therebetween the breaking or comminuting hammer mill element 1b or the like. Sugar cane cut into pieces of about 25 centimeter length are introduced into mill 1 through inlet opening 1a and while passing through the comminuting portion 1b towards outlet 1c, the cane pieces will be disintegrated into fibrous constituents having a length of about 10 centimeters and groups of medullary cells forming particles having a size up to about 1.5 mm. The mixture of medullary cell groups and separated fibrous material, however, with medullary cells still adhering to the separated fibrous portions, will pass from outlet 1c into conduit 1d. Aqueous sugar-containing liquid of relatively high sugar concentration flowing through conduit 16 is also introduced into conduit 1d. Thus, a mixture of fibrous portions and medullary portions of the comminuted sugar cane and of sugar-containing liquid will flow through conduit 1d into treating vessel 2. Treating vessel 2 will be completely filled with the suspension of fibrous and medullary sugar cane portions in aqueous sugar-containing solution. The purpose of treating vessel or whirling chamber 2 is to break the adherence of medullary particles to the fibrous constituents of the sugar cane and then to withdraw a mixture of medullary particles and sugar containing solution which is free of fibrous constituents. For this purpose, whirling chamber 2 is divided into two chambers, namely a larger chamber 2a and a smaller chamber 2b. The two chambers are separated from each other by a conical screen 4 which is adapted to rotate quickly about its axis, driven by electromotor 3. Rotation of conical screen 4 will form in chamber 2a of whirling chamber 2 a strong turbulent flow along a double kidney-shaped path. This whirling turbulent flow of the solids-liquid suspension will cause rubbing of the individual fibers of the suspension against each other with a strength sufficient to rub off any medullary cells adhering to the fibers. In order to increase the turbulence of the flow, the outer periphery of conical screen 4 which faces toward chamber 2a is provided with a plurality of turbulence causing guide means of whirling plates 4a. The rotating conical screen 4 exerts a suction effect in its axial or center area and thereby forces liquid and medullary particles through the screen openings into chamber 2b and from there into conduit 5. In this manner, medullary particles and liquid are separated from fibrous material since the fibrous material cannot pass through the openings of the conical screen and will be removed separately in a manner described below. The suspension of medullary material in sugar-containing liquid passes through conduit 5 into hydrocyclone 6.

Figure 2:
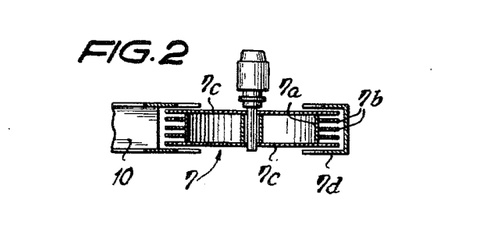
FIG. 2 is a cross-sectional plan view of one of the elements of the arrangement according to FIG. 1.

The separated fibrous material which does not leave whirling chamber 2a through screen 4 is lifted from chamber 2a by separately driven lifting wheel 7, the lower portion of which is immersed in chamber 2a. As shown in the cross sectional view of FIG. 2, lifting wheel 7 comprises cylindrical drum 7a having a cylindrical outer surface along which a series of radially extending parallel gratings 7b are arranged which are outwardly coextensive with the front walls 7c of the lifting wheel. The lifting wheel turns in the direction indicated by the arrows in FIG. 1 and the ascending portion of the lifting wheel is surrounded by the walls of shaft 7d which communicates with the upper portion of chamber 2a. The fibrous material is continuously caught by grating 7b and carried out of chamber 2a. Any loosely adhering medullary particles are flushed back into chamber 2b with liquid flowing through conduit 9 towards the upper end of shaft 7d. The liquid flowing through conduit 9 is withdrawn from filter 8 which will be described further below. The fibrous material which now is freed of medullary material and adheres to the gratings of lifting wheel 7 passes into chute 10 and from there onto a conventional dewatering screen 11 from which the fibrous material will be transported to the chute 11a. On screen 11, the fibrous material is once more washed with water circulating through conduit 12 and with fresh water introduced through conduit 13. The thus washed sugar and medullary material-free fibrous material is withdrawn from screen 11 at 11a and may be utilized in the manufacture of paper or the like. Thus, according to the present invention, the wood and fibrous material of the sugar cane is eliminated from the further processing without carrying along any sugar-containing material or medullary cells.

As stated above, the rotating screen 4 has a pumping effect. The mixture of medullary particles and sugar containing transporting liquid which passes through rotating screen 4 into chamber 2b passes then through conduit 5 into hydrocyclone 6 in which the solid-liquid mixture is separated into a solid-free sugar juice which leaves hydrocyclone 6 through conduit 14, and a thickened mass of medullary particles and sugar juice which leaves hydrocyclone 6 through conduit 17. The solids-free juice from conduit 14 is divided into a portion which passes through conduit 15 toward further processing for the recovery of sugar therefrom, and another portion which passes through conduit 16 towards whirling chamber 2a and serves as one of the constituents of the suspension formed therein. The thickened mass of medullary material passed from hydrocyclone 6 through conduit 17 into trough 8a of vacuum filter 8 and is filtered thereon. The filter cake is pressed on the filter with conventional means 8b and washed thereon with fresh water introduced through conduit 18. The cake is further pressed in conventional manner at 8c and then withdrawn onto conveyor 19 for further processing as a by-product. For instance, the thus formed mass of mechanically dry, substantially sugar and fibrous material free, medullary cell material may be used as a filter material in the further processing of the sugar juice passing through conduit 15, or the filter cake may be also used as fuel for the boilers of the sugar mill.

Thus, with the device described above, it is possible to separate the sugar-containing medullary particles of the sugar cane from the wood and fibrous constituents thereof, to treat these two different constituents of the sugar cane separate from each other and to recover the sugar-containing juice from the medullary particles. Furthermore, as described and illustrated, the fresh water which is used for removing residual sugar from the medullary cell particles and from the fibrous constituents can be utilized within the circular flow of the process in the recovery of concentrated sugar solution. The entire process can be carried out with relatively simple containers and apparatus which will have a long useful life span since they are exposed to only very limited wear and tear. The container walls may be protected against the chemical attack of sugar solutions by using suitable materials or by coating, plating or enameling the container walls in suitable manner. Compared with diffusion arrangements for the recovery of cane sugar, it will be found that the above described arrangement is extremely simple and economical to install and operate. The power required for operating rotating screen 4, lifting wheel 7, vacuum filter 8, vibrating screen 11 and the pumps required in connection with the device, is far less than the power requirements of a single sugar cane roll crusher.

The introduction and circulation of the liquid throughout the above described arrangement is controlled by special devices. The amount of fresh water which is introduced as wash water on rotating vacuum filter 8 is controlled by valve 18a which, in turn, responds to float control 20 which will maintain the upper level of the liquid in whirling chamber 2 at a predetermined height. The amount of fresh water which is used as wash water on vibrating screen 11 is adjusted by valve 13a. The liquid level of the wash water from vibrating screen 11 in trough 11b will be maintained at a predetermined height by float control 21. Pump 22 sucks wash water from trough 11b and passes a portion thereof through conduit 12 and from there onto the portion of vibrating screen 11 at which the fibrous material is introduced, while the excess liquid passes through conduit 23 into trough 8a of rotating vacuum filter 8, whereby valve 23a controls the proportion or amount of liquid thus introduced into trough 8a, depending on the height of the liquid level in trough 11b, again actuated by float control 21.

The sugar-containing liquid with highest concentration passes from chamber 2b of whirling chamber 2 through conduit 5 in a quantity which is controlled by valve 5a. The wash water in conduit 9 is of low sugar concentration due to the fresh water which is added through conduit 18 and vacuum filter 8, and this water of low sugar concentration is used for rinsing the fibrous material which is lifted from whirling chamber 2 by means of lifting wheel 7. This water of low sugar concentration then flows together with medullary particles washed off the fibrous material into whirling chamber 2. The wash water collecting in trough 11b is of the lowest concentration due to the fact that it primarily originates from fresh water conduit 13.

The apparatus as illustrated in FIG. 1 and described above is particularly suitable for processing high quality sugar cane, i.e., for sugar cane which has been grown under favorable conditions. Such sugar cane lends itself relatively easily to the separation of fibrous constituents from attached medullary material and to the breaking or rupturing of the medullary material. However, sugar cane which has been grown under somewhat less favorable conditions will have to be processed in a somewhat different manner and in a somewhat different apparatus in order to achieve complete separation of the fibrous constituents from the medullary material.

Figure 3:
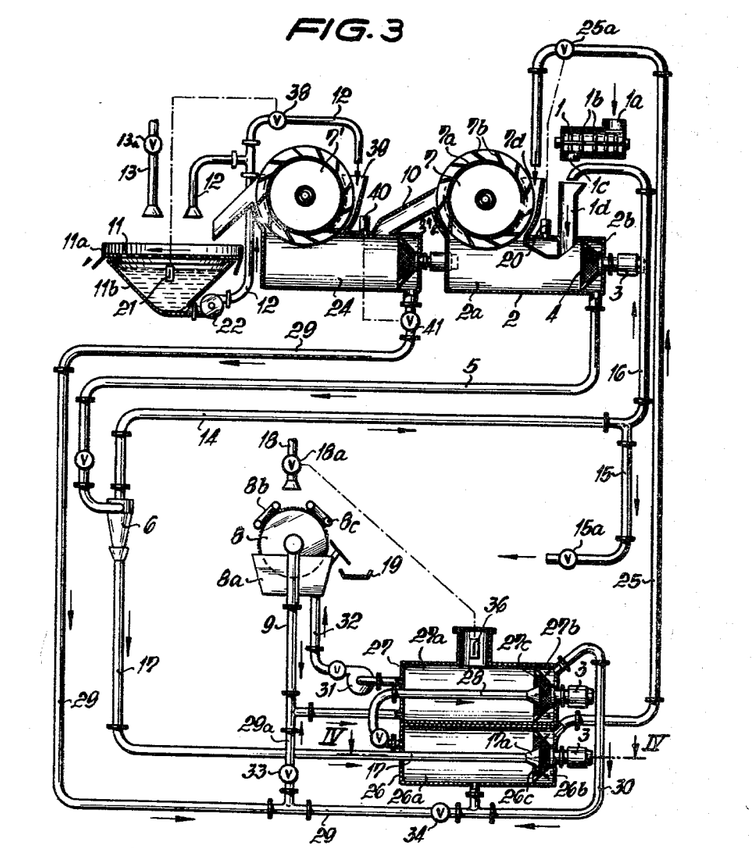
FIG. 3 is a schematic elevational view of another device according to the present invention.
Figure 4:
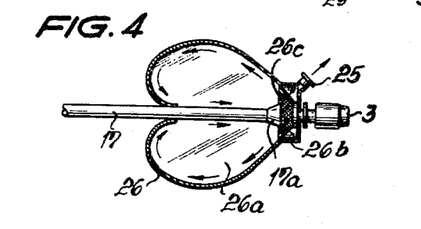
FIG. 4 is a cross-sectional view of one of the elements of the device illustrated in FIG. 3.

An arrangement for the recovery of sugar from sugar cane which has been grown under such less favorable conditions is illustrated in FIGS. 3 and 4. In all figures of the drawing identical elements are indicated by identical reference numerals.

Referring now to FIG. 3, the pieces of sugar cane pass first through a comminuting device 1 similar to that described in connection with FIG. 1 and from there through shaft or conduit 1d together with sugar-containing liquid into whirling chamber 2.

However, different from the embodiment illustrated in FIG. 1, the separated fibrous constituents which are removed by means of lifting wheel 7 are passed into a second whirling chamber 24 which is substantially similar in construction to whirling chamber 2 and which serves for separation of residual medullary material which still adheres to the fibrous constituents. While being lifted by lifting wheel 7, the fibrous material is washed or rinsed with sugar-containing liquid supplied through conduit 25 in order to wash back into whirling chamber 2 medullary material carried by, but no longer firmly adhering to, the fibrous constituents. The fibrous constituents which are substantially completely freed of medullary material in whirling chamber 2, are then lifted by a second lifting wheel 7' onto vibrating screen 11 and further treated as described in connection with FIG. 1. While being lifted by lifting wheel 7', the fibrous material is rinsed with liquid of very low sugar concentration taken from trough 11b and pumped by pump 22 through conduit 12. The medullary particles and the sugar-containing conveying or transporting liquid which pass through screen 4 into chamber 2b flow from there to hydrocyclone 6 wherein this mixture is separated into a solids-free sugar-containing liquid leaving hydrocyclone 6 through conduit 14, and a thickened mass containing the medullary material and some sugar-containing liquid which thickened mass leaves hydrocyclone 6 through conduit 17. The solids-free sugar-containing liquid flowing through conduit 14 passes partly into conduit 16 and from there through shaft 1d into whirling chamber 2, and partly through conduit 15 for further processing so as to recover sugar therefrom. The thickened mixture of sugar-containing liquid and medullary material which flows from hydrocyclone 6 through conduit 17 is then sequentially passed through washing devices 26 and 27.

Washing devices 26 and 27 are constructed in a manner similar to whirling chamber 2 and 24 however with the difference that chambers 26a, 26b and 27a and 27b of washing devices 26 and 27 are separated by rotating screens 26c and 27c having openings which are so small that the medullary particles cannot pass from chambers 26a and 27a into chambers 26b and 27b.

FIG. 4 is a cross-sectional view of washing device 26 taken along lines IV—IV of FIG. 3.

The washing devices 26 and 27 operate in the following manner:

Conduit 17 extends axially into the immediate vicinity of rotating screen 26c of washing device 26. Conduit 17 terminates there in a nozzle-like enlarged opening 17a. The medullary particles carried by the whirling liquid bounce several times against rotating screen 26c. Thereby any as yet unruptured cell walls of the medullary material are broken and the contents of the cells mix with the surrounding liquid. It is important for effectively withdrawing sugar-containing liquid from the interior of the thus ruptured cells that the liquid which is set in turbulent motion in chamber 26a of washing device 26 is of very low sugar concentration and that as little as possible of the highly concentrated sugar solution of conduit 17 will remain in chamber 26a. This is achieved by terminating conduit 17 in the immediate vicinity of rotating screen 26c. Thus, the sugar-containing liquid portion of the mass introduced through conduit 17 will immediately pass through screen 26c into chamber 26b and from there into conduit 25. Conduit 28 leads from whirling chamber 26a of washing device 26 into the vicinity of the center portion of rotating screen 27c of washing device 27 and through this conduit the medullary material plus sugar-containing liquid will be thrown against rotating screen 27c in a manner similar to that described in connection with washing device 26 and rotating screen 26c. The sugar-containing liquid which passes through screen 27c is then passed via conduit 30 to chamber 26a of washing device 26. The medullary particles which are further broken in contact with screen 27c and cannot pass through the same, are subjected to turbulent motion in chamber 27a and are then pumped together with the surrounding liquid by means of pump 31 via conduit 32 to trough 8a of rotating vacuum filter 8, in order to separate thereon the sugar-containing liquid from the broken medullary cell material. The filter cake accruing on vacuum filter 8 is treated as described in connection with FIG. 1. The solids-free, sugar-containing liquid which accrues in vacuum filter 8 is passed via conduit 9 to washing device 27.

Medullary material-containing liquid from chamber 24b of the second whirling chamber 24 passes through conduit 29 to washing devices 26 and/or 27. Conduit 29a connects conduit 29 with conduit 9 and the passage of the liquid from conduit 29 into either washing device 26 or 27 is controlled by valves 33 and 34.

Thus, according to FIG. 3 the liquid flow is arranged as follows:

The withdrawal of liquid of high sugar concentration for the recovery of sugar therefrom may, for instance, be adjusted by valve 15a to a certain rate relating to the amount of broken sugar cane introduced into the apparatus. The liquid which passes through conduit 15 and valve 15a is withdrawn from whirling chamber 2. When the liquid level in whirling chamber 2 is lowered thereby, then float control 20 will actuate valve 25a so that liquid from washing device 26 will flow through conduit 25 to whirling chamber 2. This will cause a lowering of the liquid level in washing device 27 which communicates with device 26. This, in turn, will actuate float control 36 and consequently valve 18a for the introduction of fresh water from conduit 18 onto filter 8 and therefrom into washing device 27.

In addition to the introduction of fresh water through conduit 18, fresh water is also introduced through conduit 13 for the removal of residual sugar from fibrous material on vibrating screen 11. The quantity of fresh water introduced through conduit 13 can be adjusted by operating hand valve 13a. The combined total of fresh water introduced through conduits 13 and 18 together with the liquid contained in the sugar cane will equal the amount of sugar-containing liquid which is withdrawn from the illustrated device for the recovery of sugar therefrom. The fresh water introduced through conduit 13 will raise the liquid level in trough 11b. When the liquid level in trough 11b rises above a predetermined height, then float control 21 will open valve 38 in conduit 12 so that the additional wash water may enter through shaft 39 into whirling chamber 24, when thereby the liquid level in whirling chamber 24 rises above a desired level, then float control 14 will open valve 41 and the excess liquid will flow through conduit 29 either to washing device 26 or washing device 27.

Figure 5:
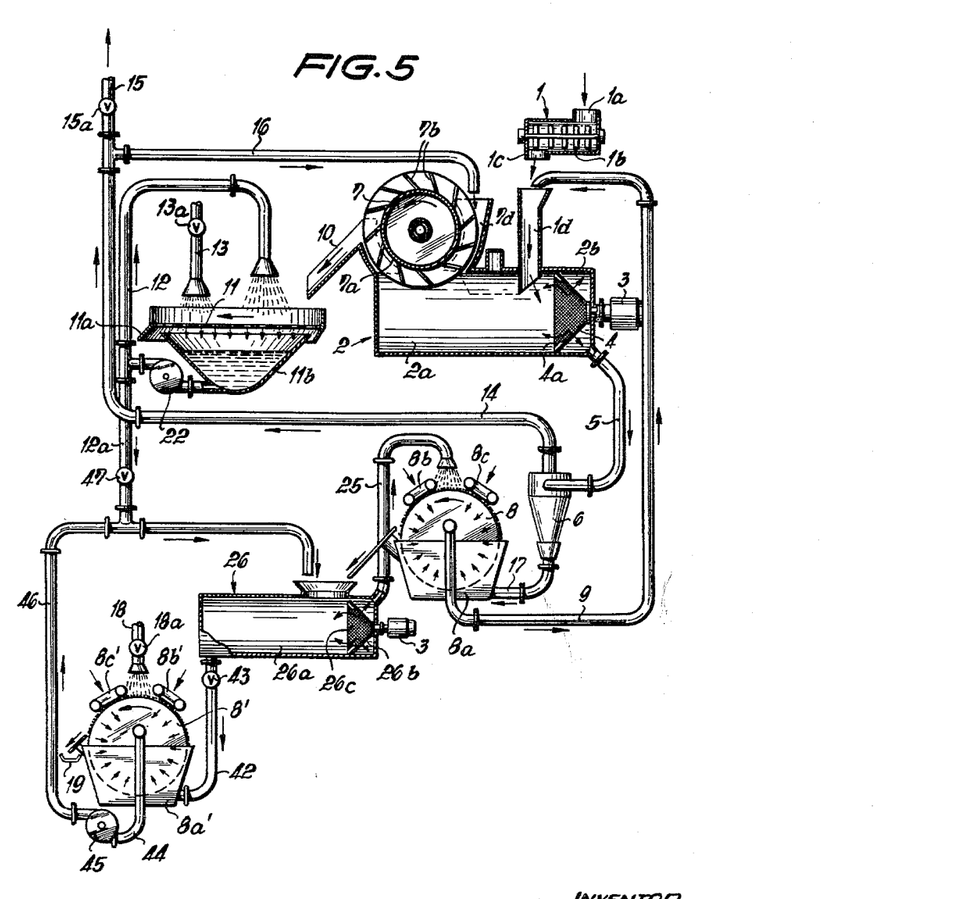
FIG. 5 is a schematic elevational view of yet another embodiment of the present invention.

According to another embodiment of the present invention, as illustrated in FIG. 5, the comminuted sugar cane together with sugar-containing liquid are again introduced through shaft 1b into whirling chamber 2 and liquid plus medullary particles are passed via conduit 5 to hydrocyclone 6. In this case again, the fibrous material is withdrawn by means of lifting wheel 7 and passes over chute 10 to vibrating dewatering screen 11 where the residual sugar-containing liquid is washed off the fibrous material with wash water circulating through conduit 12 and pump 22. In addition, fresh water is added through conduit 13. The fibrous material which is now practically completely free of sugar and medullary material is then withdrawn for further processing, for instance to paper or the like.

The solids-free liquid of high sugar concentration which leaves hydrocyclone 6 through conduit 14 is partly withdrawn at valve 15 for recovery of sugar therefrom, while the residual portion of this liquid is recycled through conduit 16 and used to wash off medullary material from the fibrous constituents being lifted by lifting wheel 7 from whirling cell 2a. The thickened mass of medullary particles and sugar-containing liquid which leaves hydrocyclone 6 through conduit 17 passes into trough 8a of vacuum filter 8 which filter operates in the same manner as described in connection with FIG. 1. The wash water which has been used for washing medullary material on vacuum filter 8 passes now, in a manner different from the one illustrated in FIG. 1, through conduit 9 back into shaft 1d and whirling chamber 2a for forming therein a mixture with comminuted sugar cane from comminuter 1. The filter cake formed on filter 8 is scraped off and dropped into washing device 26 which again is constructed substantially like whirling chamber 2 with the exception that the rotating conical screen 26c of washing device 26 is formed with perforations which are sufficiently fine to prevent passage of medullary material therethrough. The liquid which thus passes free of medullary material through screen 26c into chamber 26b will then flow through conduit 25 and will be used for washing residual sugar off the medullary material on vacuum filter 8. The medullary material-containing liquid of chamber 26a of washing device 26 passes through conduit 42 in a quantity controlled by valve 43 into trough 8a' of a second rotating vacuum filter 8', and is filtered thereon. The water content of the thus formed filter cake is reduced by pressure applying device 8b', the cake then again washed with fresh water from conduit 18, again pressed at 8c' and then withdrawn by conveyor device 19. The filtrate which is formed in vacuum filter 8' and which is of low sugar concentration due to the addition of fresh water from conduit 18 is withdrawn through conduit 44 and passed by means of pump 45 and conduit 46 back into washing device 26.

The excess wash water beyond that which is circulated from trough 11b onto screen 11, passes through conduit 12a in an amount controllable by means of valve 47 into conduit 46 and thus into washing device 26.

In accordance with the presently discussed embodiment, the liquid levels in whirling chamber 2, trough 11b and washing device 26 are adjusted relative to each other by float controls in a manner similar to that described in connection with FIGS. 1 and 3.

It is, of course, within the scope of the present invention to modify the illustrated arrangements. However, it is essential that the fibrous material is taken out of the process as quickly as possible and in such a manner that the liquid contained in the fibrous material, i.e., the liquid contents of the cells of the fibrous material remain in the fibrous material and are withdrawn with the same and are not admixed to the sugar-containing liquids of the inventive process. In other words, the fibrous material is to be separated from the medullary material without being subjected to pressing or to any other processing steps which might cause rupturing of an appreciable portion of the cells of the fibrous material. This is important due to the fact that the cellular juices of the fibrous material contain only a very small and insignificant percentage of sugar, however, these juices of the cells of the fibrous material contain a high percentage of salts and other nonsugar solids which would reduce the purity of the sugar-containing liquid which is obtained in accordance with the present invention and from which sugar is to be recovered.

Furthermore, it is important that the sugar-containing liquid which adheres to or is contained in the interior of the medullary cells is separated in each treating step to the largest possible extent from the ruptured medullary cell material so that these ruptured cell wall portions reach the next treating step as a relatively dry material. This again will reduce the residual amount of sugar in the medullary material which in subsequent process steps is withdrawn from the broken cells thereof and this will reduce the sugar concentration in the washing liquid obtained in such subsequent process steps. While the present method and apparatus were described as utilizing hydrocyclones for separating sugar containing conveying or transporting liquid from the broken medullary cell material, it is of course also possible to use instead of hydrocyclones, pressure filters or other suitable devices such as centrifuges, decanters, settling devices, thickeners, and the like, which per se are well known in the art.

Thus, according to the present invention, a mixture of sugar-containing liquid and comminuted sugar cane portions is formed, wherein the sugar cane portions due to such comminution are already separated to a considerable extent into medullary particles and fibrous particles, the fibrous particles are separated from adhering medullary cells and thereafter the fibrous particles or portions are withdrawn from the processing mixture. The cell walls of the medullary particles are ruptured so that the sugar containing liquid from the interior of the medullary cells will be freed and will be mixed with the transporting liquid, the ruptured medullary cell walls are separated from the liquid and excess liquid is pressed off the same, the separately withdrawn fibrous material and medullary cell wall material are washed so as to recover residual sugar therefrom and the wash waters containing such residual sugar are reintroduced into the process. According to one preferred embodiment of the present invention, the filter cake consisting of broken medullary cell walls is passed through a concurrent or counter-current washing device in order to further remove residual sugar therefrom and then is again filtered and pressed.

The apparatus of the present invention thus comprises a comminuting device 1 from which the mixture of comminuted sugar cane and sugar containing liquid passes into a whirling chamber 2 on which is mounted lifting wheel 7 for withdrawing from the whirling chamber the separated fibrous portions. Rotating conical screen 4 separates whirling chamber 2 into two chambers and is formed with holes of sufficient size to permit passage therethrough of not only the sugar containing liquid but also the broken medullary material while fibrous portions cannot pass through rotating screen 4. In this manner, a mixture of medullary material and of sugar-containing liquid can be withdrawn from whirling cell 2 and passed to a thickening device such as hydrocyclone 6 wherein this mixture is separated into a solids-free liquid of relatively high sugar concentration and a thickened mass of medullary material and residual sugar-containing liquid. The device further includes a filter arrangement, preferably vacuum filter 8 for separating the broken medullary cells from the adhering sugar-containing liquid. The fibrous material passes from lifting wheel 7 onto vibrating screen 11 where residual sugar-containing liquid is washed off the fibrous material so that a substantially sugar and medullary cell-free fibrous material is obtained, forming an excellent raw material for the manufacture of paper. Between thickening device 6 and filter 8 there may be arranged washing devices 26 and 27 for assuring the breaking of substantially all medullary cells and thus the recovery of substantially all of the sugar-containing liquid from the interior of the medullary cells.

It is also contemplated to provide after filter 8 a washing device 26 for the further treatment of the filter cake, which is then followed by a second filter device 8'.

The filter devices 8 and 8' preferably include accessory pressure de-watering arrangements 8b and 8b' and are operatively associated with source 18 of fresh water for removing residual sugar from the filter cake. The preferred embodiment of the rotating screen separating the two portions of whirling chambers 2 and 24, and washing devices 26 and 27 is a conical screen coaxial with the respective whirling chamber or washing device and having an apex facing away from chambers 2a, 24a, 26a and 27a respectively. The conical screen is driven so as to rotate about its axis with sufficiently high speed to achieve the desired turbulent movement in chambers such as chambers 2a, and to force liquid and particles which are sufficiently small to pass through the openings of the screen (in the case of whirling chambers 2 and 24) through the screen and out of the respective whirling chamber or washing device into the conduit leading to the next portion of the apparatus. Finally, according to another preferred embodiment of the present invention, two whirling chambers 26 and 27 serve as the washing devices for washing out sugar-containing liquid from the cells of the medullary material, and these two washing devices are arranged in sequence with the conveying liquid passing in counter-current to the solids in these two washing devices.

Figure 6:
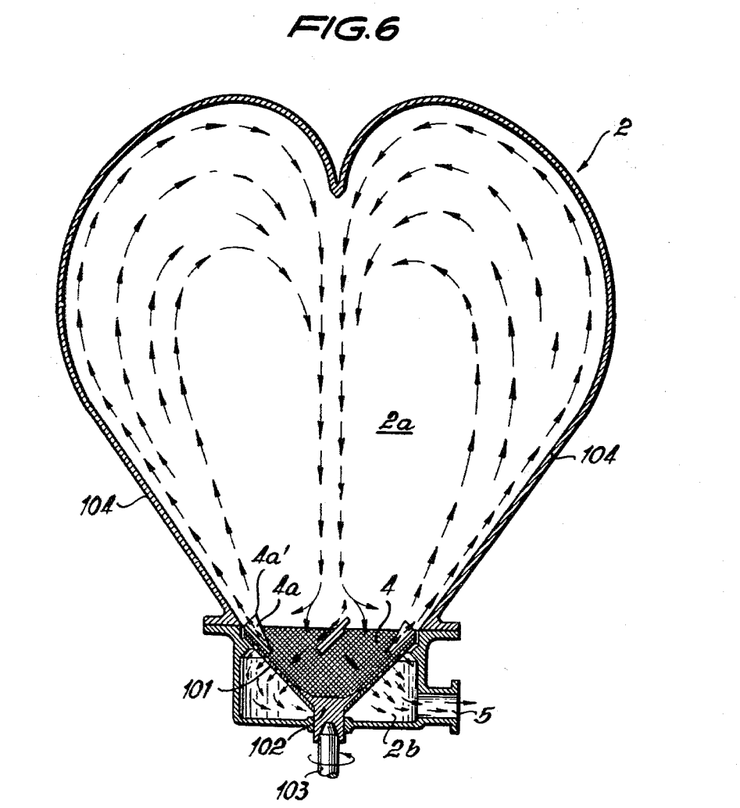
FIG. 6 is a horizontal cross-sectional plan view, on an enlarged scale, of a portion of the device illustrated in FIG. 1.

Referring now to FIG. 6 the main component part of the whirling chamber 2 is a conical rotary screen 4 which is dividing the whirling chamber 2 into the larger chamber 2a and the smaller chamber 2b. The conical rotary screen 4 is fixed to the conical perforated drum 101 in known manner and the drum 101 is fixed to the hub 102 of a drive shaft 103. The hub 102 is rotatably mounted in the wall of the smaller chamber 2b and its shaft 103 is driven at high speed by a motor 3 shown in FIG. 1. At the outer periphery of conical screen 4 which faced towards chamber 2a there are arranged a number of whirling plates 4a, e.g., three or four, of triangular shape. Each whirling plate 4a is so arranged, that their upper edge 4a' is extended in the room of the larger chamber 2a. The surface of each whirling plate 4a is inclined to the axis of the drive shaft 103 at an angle of 45 degrees in the manner as shown in FIG. 6. Rotation of conical screen 4 and whirling plates 4a will form in chamber 2a a strong turbulent flow as indicated by arrows and the walls 104 of chamber 2a are formed as a double kidney-shape, so that the solids-liquid suspension flows along the walls and returns to the centre of the screen. The liquid which is entering the smaller chamber 2b flows off by means of the conduit 5.

*Example of experiment*

One hundred kg. of sugar cane were treated in an experimental plant. The analysis of this quantity of sugar cane gave the following results:

| | Kg. |
|---|---|
| Sugar | 13.0 |
| Nonsugar | 2.0 |
| Medullary particles | 3.0 |
| Fibrous material | 9.5 |
| Water | 72.5 |

One hundred kg. of raw juice were obtained from this quantity of sugar cane. The raw juice contained 98% sugar resulting from the sugar contained in the sugar cane. The purity of the raw juice was 89%.

The composition of the raw juice is as follows:

| | Kg. |
|---|---|
| Sugar | 12.73 |
| Nonsugar | 1.57 |
| Water | 85.70 |

The weight of the medullary particles leaving the plant has been 5.8061 kg. This figure includes:

| | Kg. |
|---|---|
| Sugar | 0.0461 |
| Medullary particles | 3.0000 |
| Water | 2.7600 |

The weight of the fibrous material leaving the plant has been 18.9039 kg., including

| | Kg. |
|---|---|
| Sugar | 0.2239 |
| Nonsugar | 0.4300 |
| Fibrous material | 9.5000 |
| Water | 8.7500 |

The results of this experiment are therefore that 24.71 kg. of water where necessary to obtain a quantity of 100 kg. of raw juice.

It will be understood that each of the elements described above, or two or more together, may also find a useful application in other types of apparatus for the recovery of sugar from sugar cane differing from the types described above.

While the invention has been illustrated and described as embodied in a device for processing sugar cane, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a device for the recovery of sugar from sugar cane, in combination, comminuting means for breaking pieces of sugar cane into a mixture of first particles consisting substantially of medullary material and second particles consisting of fibrous material having medullary material adhering thereto; separating and rupturing means for separating said second particles of said mixture into particles consisting substantially only of fibrous material and particles of medullary material and for rupturing cell walls of the medullary material, said separating and rupturing means comprising an elongated treating vessel having two opposite end portions and being adapted to be filled with a suspension of said mixture and aqueous liquid, substantially conical rotatable screen means located in one of said end portions extending substantially through the entire cross-section of said treating vessel, flaring towards the other of said end portions and adapted for passing therethrough of liquid and medullary material only, and means for continuously introducing said mixture and aqueous liquid into said treating vessel so as to substantially completely fill the same, whereby upon rotating of said rotatable screen means the contents of said treating vessel will be subjected to turbulent motion causing separation of fibers from medullary material, rupturing of cells of medullary material and dissolution of the sugar content of said medullary material; first withdrawal means for withdrawing a mixture of liquid and medullary material having passed through said screen means from said one end portion of said treating vessel; and second withdrawal means including a lifting wheel for withdrawing fibrous material from the other of said end portions.

2. A device for the recovery of sugar from sugar cane as defined in claim 1 and including means for separating that withdrawn mixture of liquid and medullary material into sugar-containing liquid and medullary material of substantially reduced sugar content.

3. In a device for the recovery of sugar from sugar cane as defined in claim 1, vibrating screen means operatively associated with said lifting wheel for receiving said withdrawn fibrous material and separating the same from a portion of the liquid adhering thereto.

4. A device for the recovery of sugar from sugar cane as defined in claim 2 and including washing and filter means for said separated medullary material of substantially reduced sugar content.

5. A device for the recovery of sugar from sugar cane as defined in claim 2 and including pressure filter means for said separated medullary material of substantially reduced sugar content adapted to form a filter cake thereof; and washing means for the thus formed filter cake.

6. A device for the recovery of sugar from sugar cane as defined in claim 3 including washing means operatively associated with said vibrating screen means.

7. In a device for the recovery of sugar from sugar cane, in combination, comminuting means for breaking pieces of sugar cane into a mixture of first particles consisting substantially of medullary material and second particles consisting of fibrous material having medullary material adhering thereto; separating and rupturing means for separating said second particles of said mixture into particles consisting substantially only of fibrous material and particles of medullary material and for rupturing cell walls of the medullary material, said separating and rupturing means comprising an elongated treating vessel having two opposite end portions and being adapted to be filled with a suspension of said mixture and aqueous liquid, substantially conical rotatable screen means located in one of said end portions extending substantially through the entire cross-section of said treating vessel, flaring towards the other of said end portions and adapted for passage therethrough of liquid and medullary material only, and means for continuously introducing said mixture and aqueous liquid into said treating vessel so as to substantially completely fill the same, whereby upon rotating of said rotatable screen means the contents of said treating vessel will be subjected to turbulent motion causing separation of fibers from medullary material, rupturing of cells of medullary material and dissolution of the sugar content of said medullary material; first withdrawal means for withdrawing a mixture of liquid and medullary material having passed through said screen means from said one end portion of said treating vessel; and second withdrawal means including a lifting wheel for withdrawing fibrous material from the other of said end portions, said lifting wheel comprising a drum having a cylindrical outer face and a plurality of parallel annular gratings extending outwardly in radial direction from said cylindrical outer face of said drum.

8. In a device for the recovery of sugar from sugar cane, in combination, comminuting means for breaking pieces of sugar cane into a mixture of first particles consisting substantially of medullary material and second particles consisting of fibrous material having medullary material adhering thereto; separating and rupturing means for separating said second particles of said mixture into particles consisting substantially only of fibrous material and particles of medullary material and for rupturing cell walls of the medullary material, said separating and rupturing means comprising an elongated treating vessel having two opposite end portions and being adapted to be filled with a suspension of said mixture and aqueous liquid, substantially conical rotatable screen means located in one of said end portions extending substantially through the entire cross-section of said treating vessel, flaring toward the other of said end portions and adapted for passage therethrough of liquid and medullary material only, said conical screen means having an outer peripheral portion facing toward said other end of said elongated treating vessel and including a plurality of turbulence causing guide means arranged at said outer peripheral portion and means for continuously introducing said mixture and aqueous liquid into said treating vessel so as to substantially completely fill the same, whereby upon rotating of said rotatable screen means the contents of said treating vessel will be subjected to turbulent motion causing separation of fibers from medullary material, rupturing of cells of medullary material and dissolution of the sugar content of said medullary material in said liquid; first withdrawal means for withdrawing a mixture of liquid and medullary material having passed through said screen means from said one end portion of said treating vessel; and second withdrawal means including a lifting wheel for withdrawing fibrous material from the other of said end portions.

9. In a device for the recovery of sugar from sugar cane, in combination, comminuting means for breaking pieces of sugar cane into a mixture of first particles consisting substantially of medullary material and second particles consisting of fibrous material having medullary material adhering thereto; separating and rupturing means for separating said second particles of said mixture into particles consisting substantially only of fibrous material and particles of medullary material and for rupturing cell walls of the medullary material, said separating and rupturing means comprising an elongated treating vessel having two opposite end portions and being adapted to be filled with a suspension of said mixture and aqueous liquid, substantially conical rotatable screen means located in one of said end portions extending substantially through the entire cross-section of said treating vessel, flaring towards the other of said end portions and adapted for passing therethrough of liquid and medullary material only, and means for continuously introducing said mixture and aqueous liquid into said treating vessel so as to substantially completely fill the same, whereby upon rotating of said rotatable screen means the contents of said treating vessel will be subjected to turbulent motion causing separation of fibers from medullary material, rupturing of cells of medullary material and dissolution of the sugar content of said medullary material; first withdrawal means for withdrawing a mixture of liquid and medullary material having passed through said screen means from said one end portion of said treating vessel; second withdrawal means including a lifting wheel for withdrawing fibrous material from the other of said end portions; and second rupturing means having a structure substantially corresponding to that of said separating and rupturing means for receiving a mixture of liquid and medullary material from said separating and rupturing means for further rupturing cells of said medullary material so as to dissolve the sugar content thereof in said liquid.

(References on following page)

References Cited in the file of this patent

UNITED STATES PATENTS

| | | |
|---|---|---|
| 1,818,897 | Kumagawa et al. | Aug. 11, 1931 |
| 2,650,176 | Horton et al. | Aug. 25, 1953 |
| 2,661,666 | Knoll | Dec. 8, 1953 |
| 2,717,195 | Armstrong | Sept. 6, 1955 |
| 2,744,037 | Lathrop | May 1, 1956 |
| 2,818,358 | Brownell et al. | Dec. 31, 1957 |
| 2,839,398 | Stuck | June 17, 1958 |

FOREIGN PATENTS

| | | |
|---|---|---|
| 742,916 | Great Britain | Jan. 4, 1956 |

OTHER REFERENCES

Stephenson: Pulp and Paper Manufacture, vol. 2, Preparation of Stock for Paper Making, First Edition, 1951, McGraw-Hill, New York, pp. 199–201 relied on.

Noland: The Alkaline Pulping of Bagasse, etc., The Paper Industry, April 1955, pp. 52–57 and 29.